United States Patent [19]
Appleby et al.

[11] 3,841,033
[45] Oct. 15, 1974

[54] TIRE MANUFACTURING

[75] Inventors: Paul E. Appleby, Cuyahoga Falls; William D. Braden, Stow; Leonard A. Vandale, Akron, all of Ohio

[73] Assignee: The Goodyear Tire & Rubber Company, Akron, Ohio

[22] Filed: Apr. 4, 1974

[21] Appl. No.: 457,939

Related U.S. Application Data

[63] Continuation-in-part of Ser. No. 266,776, June 27, 1972, abandoned.

[52] U.S. Cl. ......... 51/289 R, 51/106 R, 51/165.91, 51/281 R, 51/DIG. 33
[51] Int. Cl. ...................... B24b 1/00, B24b 49/04
[58] Field of Search ........... 51/DIG. 33, 281 R, 286, 51/289 R, 106 R, 33 W, 99, 165.74, 165.76, 165.91; 73/146

[56] References Cited
UNITED STATES PATENTS

| | | | |
|---|---|---|---|
| 3,375,714 | 4/1968 | Bottasso | 73/146 |
| 3,553,903 | 1/1971 | Christie | 51/106 R X |
| 3,681,877 | 8/1972 | Shively | 51/106 R |
| 3,724,137 | 4/1973 | Hofelt | 51/106 R |
| 3,739,533 | 6/1973 | Iida | 51/281 R |

Primary Examiner—Donald G. Kelly
Attorney, Agent, or Firm—F. W. Brunner; R. S. Washburn

[57] ABSTRACT

Reduction of radial runout of a tire tread is combined with reduction of variation of radial force exerted by the tire on a load roll representing a road surface. The variations (i.e., in force and/or in runout) are measured by known electronic circuitry which also provide signals used to regulate the amount of and determine the location of material to be removed from the tire by grinding. Reduction of force variation is made by grinding wheels positioned to remove material at the lateral edges or outer ribs of the tire. Radial runout is reduced by a single concave surface wheel positioned to remove material from the tread between the lateral edges thereof.

The foregoing abstract is not to be taken as limiting the invention of this application, and in order to understand the full nature and extent of the technical disclosure of this application, reference must be made to the accompanying drawing and the following detailed description.

7 Claims, 2 Drawing Figures

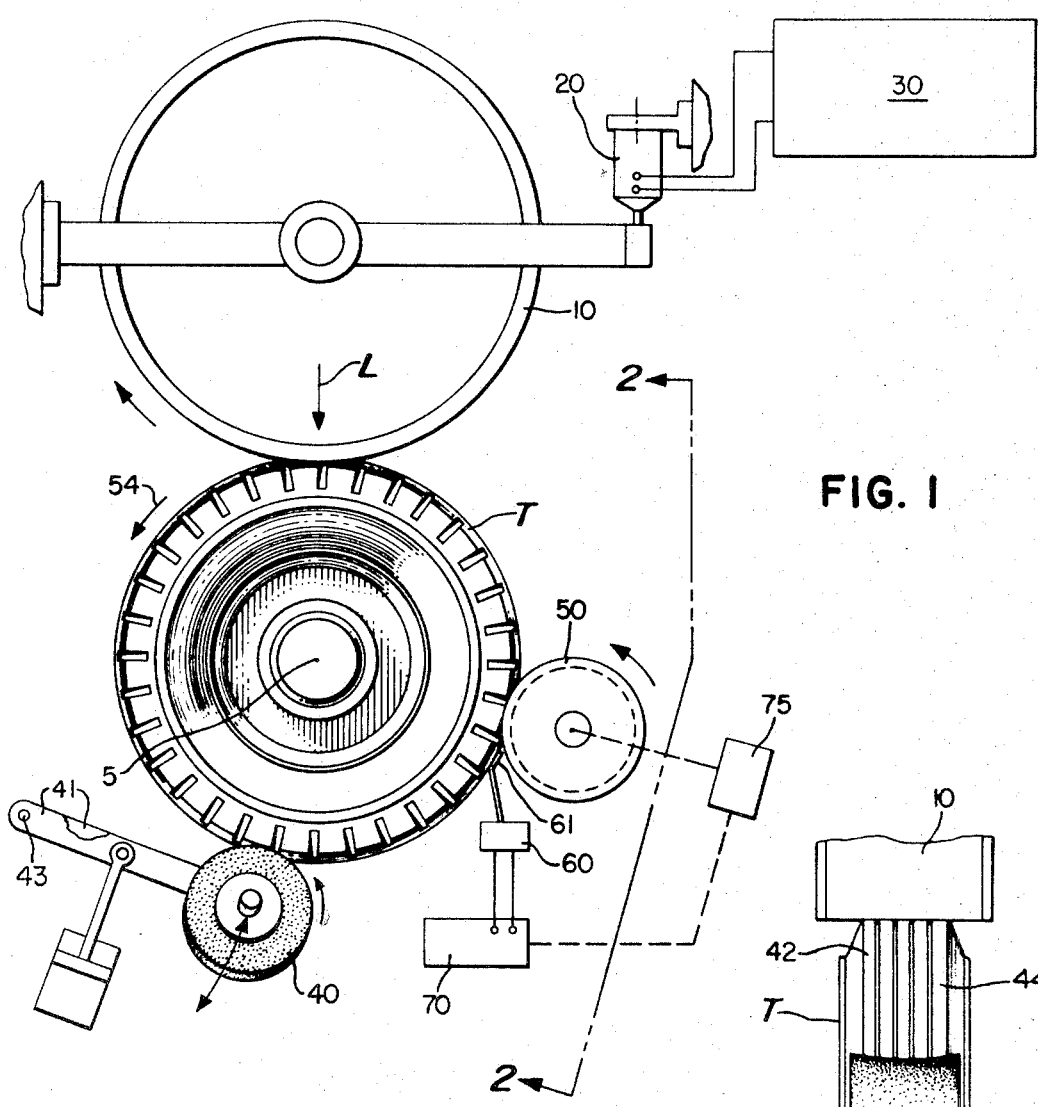
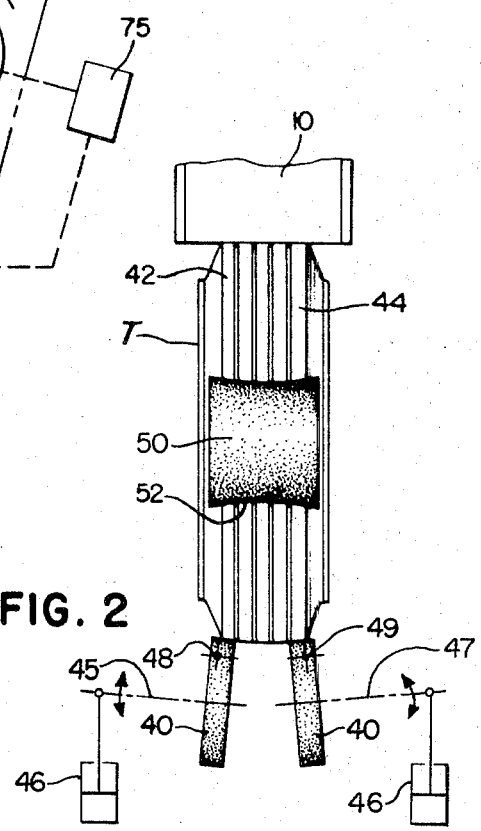
FIG. 1
FIG. 2

3,841,033

TIRE MANUFACTURING

The present application is a continuation-in-part of a prior copending application Ser. No. 266,776, filed June 27, 1972, which is now abandoned.

This invention relates to the manufacture of tires and particularly to the reduction of force variations in the tire and to the reduction of variations in the radius of the tire tread surface with respect to the tire rotational axis.

BACKGROUND OF THE INVENTION

It is known that the radius of a manufactured tire, as measured from the rotational axis to the outer circumference or tread surface of such tire, may vary somewhat between different angular locations about the tire axis. It is known that variations in the radius of the tread surface or ground contacting portion of a tire can, in some cases, result in vibrations in the vehicle on which the tire is mounted. Such vibrations may, under certain circumstances, undesirably affect tire aesthetics relating to passenger comfort. These variations in radius have been reduced in the past by grinding or otherwise removing material from the tread surface so as to provide the tire with a ground contacting surface having a more nearly constant or essentially constant radius with respect to the tire rotational axis. Such operations are often referred to "truing" the tire.

It is also known that a tire normally exhibits some degree in variation in the forces which it exerts upon its supporting surface which are not attributable to the radius variations described above but rather are believed to be caused by non-uniformities in the tire construction. These non-uniformities are difficult, if possible, to avoid in the manufacture of pneumatic tires. While such non-uniformities do not affect the durability or tread life of a tire, in some cases they can result in vibrations in the vehicle on which the tire is mounted. Such vibrations may, under certain circumstances, also undesirably affect tire aesthetics relating to passenger comfort. U.S. Pat. No. 3,553,903 discloses an apparatus which measures such variations in forces and also reduces such variations by grinding material from the tread surface.

SUMMARY

By combining in a single operative procedure the measurement and reduction of variations in force exerted radially by the tire and the measurement and reduction of variations in the radius of the tread surface of the tire, unanticipated advantages can be attained. One particular advantage achieved by the combination of such operations is that such variations can be reduced or removed not only more rapidly but also that both types of variation can, in at least a useful number of such tires, be brought into acceptable limits by the removal usually of less material from the tread surface of the tire than can be accomplished when the described corrections are made separately.

Primary objects of the invention are the provision of methods and apparatus for reducing the described variations in a tire more economically and more effectively than heretofore.

The aforementioned objects and others which will become apparent or be particularly pointed out in the ensuing description are accomplished in accordance with the invention by, during continuing uninterrupted revolution of a tire about its own revolution axis, measuring concurrently both variations in force exerted radially by the tire and variations in radius of the tire and while continuing such measuring, removing material from at least one of the two lateral margins of the tread surface of such tire in amount and angular location such as to reduce the variations in radial force being measured and concurrently removing material from between the lateral margins of the tread surface in amount and angular location such as to reduce the variations in radius being measured.

DRAWINGS

FIG. 1 is a plan view showing schematically an apparatus for the practice of the invention; and FIG. 2 is a view of the apparatus of FIG. 1, oriented as indicated by the line 2—2.

SPECIFIC EMBODIMENT

Referring to the drawing and particularly to FIG. 1; a tire T to be treated in accordance with the invention is mounted upon a rotatable chuck (not shown) and inflated. The chuck is mounted for rotation about a precisely fixed axis 5 and is rotatable at a predetermined constant speed.

A radial load is applied to the tire by load means in the form of a precision load roll 10 which is moved, by any suitable means, radially toward the axis 5 to apply a predetermined basic deflecting load L against the tire T. The load roll 10 is rotated by the tire. Variations in the radial force exerted by the tire between the axis 5 and the load roll 10 are detected by a force transducer 20 and converted by the electronic circuitry 30 to signals effective to move the grinding wheels 40 radially into appropriate engagement with at least one of the lateral margins 42, 44 of the outer circumference of the tire which are usually referred to as the shoulder or outer rib portions of the tire tread. The aforementioned patent, the disclosure of which is incorporated herein by reference, discloses in greater detail the electronic circuitry 30 and the mode of operation thereof.

FIG. 2 illustrates in particular the relation of the force variation grinding wheels 40 with the tread surface. The wheels 40 are mounted in any suitable apparatus for movement toward and away from the margins 42, 44 in response to signals from the circuitry 30. In particular, each wheel 40 is carried by an arm 41 to swing toward and away from the tire T about an axis 43 which extends parallel to the axis 5. Advantageously, also, the mounting apparatus is adjustable to position the cutting surface of the wheels 40 to contact the coned or curved slopes of the cross-section profile of the respective lateral margins 42, 44. As illustrated schematically in FIG. 2, each wheel 40 is mounted for rotation about an axis 45, 47, respectively, with each such axis being coplanar with the tire axis 5 when the grinding wheel engages the respective lateral margin 42, 44. Means for effecting adjustment of the positions of the wheels 40 relative to the slope of the margins 42, 44 are provided by the cylinders 46 which operate to swing the respective axes 45, 47 about pivots 48, 49 the centerlines of which are perpendicular with respect to the axes 45, 47 and between the circular edges of the respective wheels 40.

In operation, the wheels 40 are first moved toward the tire by the arms 41 to actuate a first limit switch (not shown), and then adjusted about the pivots 48 and 49, respectively, to actuate a second limit switch (not shown), which operates to arrest the movement and hold the axis 45, 47 in the so-adjusted position. The grinding faces of the wheels 40 are thereby positioned so as to remove material from across the widths of the margins 42, 44, which is to say of the present embodiment, the axially outer ribs of the tire tread.

It will be appreciated that material can be removed from the surface or surfaces all around the tire, for example for cosmetic reasons. Within the ambit of the invention, only very small amounts of material are removed from the tread surfaces, particularly at the margins 42, 44 and such removal is normally not intended to extend all around the tire, but rather in accordance with the invention to remove small amounts of material over those areas wherein the force transducer has detected positive force variations exceeding a predetermined amount.

In normal operation, the tire T will be caused to rotate through one or more complete revolutions under load before the grinding wheels 40 are brought into engagement in order to warm up the tire.

Referring to FIG. 2, a grinding wheel 50 having a concave surface 52, the radius of curvature of which is equal to or slightly greater than the radius of curvature of the tread in an axial plane of the tire, is moved radially toward the tire in an arcuate location behind the force variation grinding wheels 40 and ahead of the load wheel 10 with reference to the direction of rotation (arrow 54) of the tire. A radial runout sensor 60 is associated with the wheel 50 and contacts an intermediate surface of the tread between the shoulder regions or margins 42, 44 and is mounted to be deflected by variations in the radial distance between the axis and the point of contact of the feeler 61.

The grinding wheel 50 can be moved inward rapidly to a position close to the tread of the tire which movement brings the feeler 61 into sensing contact or relation with the tread surface. The sensor 60 provides signals proportional to the variations in radius experienced by the feeler 61, which signals are communicated to the control circuit 70. The infeed drive 75 moves the wheel in response to signals from the circuit 70. The wheel 50 is then moved, responsively, to the signals from circuit 70, radially in small increments of, for example, about 0.002 inch at each revolution of the tire. While variations in the radius of the tread exceed a predetermined amount, the wheel 50 continues to be fed inwardly a small predetermined increment at each revolution of the tire so as to remove material from the intermediate width of the tread lying between the margins 42, 44 wherever such tread surface exceeds the predetermined limit of variation. When the high spots, which is to say the positive or "plus" variations in the radius as detected by the feeler 61, of the intermediate width of the tread have been removed by the wheel 50, the oscillations of the detector finger 61 thereby are reduced to a predetermined amount corresponding to the allowable radius variation and further infeed of the wheel 50 is stopped.

Removal of material from the tread to reduce radius variation can affect the load L exerted by the tire on the load wheel. The signal generated by the force transducer 20 in response to variations in the load thereon and communicated to the force variation grinding wheels will be modified to the extent that the load is affected by the radius variation reduction.

While variations in the radius of a tire can contribute to force variation as measured by the transducer 20, both radius errors and force variations are at least to some degree random in relation to each other. When corrections aimed at complete or partial reductions of force variation and of radius variation are attempted in separate independent operations, there is some probability of adversely affecting the earlier made reduction in the selected variation by the corrective operation attempted in the later, whichever of the two operations is performed first.

It is contemplated within the scope of the present invention that the radius variations described can be measured alternatively or additionally by locating a sensor or sensors 60 to place the respective fingers 61 thereof into contact with the particular lateral portions of the tread which is to be measured.

While certain representative embodiments and details have been shown for the purpose of illustrating the invention, it will be apparent to those skilled in the art that various changes and modifications may be made therein without departing from the spirit or scope of the invention.

What is claimed is:

1. Method of reducing non-uniformity of radial force and radial dimension in a tire which method comprises, inflating and rotating said tire about a fixed axis, and while said tire continues to rotate about said axis applying to said tire a radial load sufficient to deflect the tire, concurrently sensing the radial runout of the tire tread surface, force variation sensing by force measuring means the variations in force exerted by the tire on said load and while continuing said force variation sensing, removing material from the tire tread surface at at least one of the two marginal portions thereof in response to said variations in force and in amount and angular location such as to reduce the variations in force, and while continuing said runout sensing, removing material from said surface between said marginal portions in response to said radial runout in amount and angular location such as to reduce the radial runout of the tire.

2. The method of reducing variation in force and in radius of a tire comprising in combination during continuing uninterrupted revolution of said tire about its own revolution axis, the steps of:

A. measuring variations in force exerted radially by the tire between means rotatably mounting the tire and load means urged against the outer circumference of the tire;

B. removing material in response to measurements obtained in step (A) from at least one of the two lateral margins of the tread circumference of the tire in amount and angular location such as to reduce said variations in force while continuing step (A);

C. during continuance of steps (A) and (B), measuring variations in radius of said circumference about its rotational axis; and D. while continuing steps (A) and (C), removing material in response to measurements obtained in step (C) from said circumference between said margins in amount and angular location such as to reduce said variations in radius;

whereby effects of step (D) are detected during continuance of step (A).

3. In the method as claimed in claim 2, continuing to remove material according to step (D) in successive small radial increments to reduce the variations according to step (C) to acceptable limits.

4. In the method as claimed in claim 2, continuing measurement according to step (A) thereby to measure also the variation in radial force effected by step (D).

5. The method of reducing variations of force and of radius in a tire comprising:
  A. mounting said tire on a rotatable chuck;
  B. moving a rotatable radial load sensing roll into tire deflecting engagement with said tire;
  C. sensing variations in radial load experienced by said roll as said tire rotates;
  D. measuring variations in radius of the tread portion of said tire at a place arcuately spaced away from the portion of the tire being deflected by the load roll;
  E. removing material from at least one of the lateral margins of the tread in amount and angular location tending to reduce the variations in radial load experienced by said roll; and
  F. concurrently removing material from the tread between said lateral margins in amount and location tending to reduce said variation in radius of the tread portion of said tire.

6. In the method as claimed in claim 5, removing material according to step (F) in successive small radial increments, each such increment being associated with at least one complete revolution of the tire about its axis.

7. In the method as claimed in claim 5, wherein removal of material according to steps (E) and (F) is effected over less than the complete circumference of the tire.

* * * * *